(12) United States Patent  
Fong et al.

(10) Patent No.: US 8,661,416 B2  
(45) Date of Patent: *Feb. 25, 2014

(54) METHOD AND APPARATUS FOR DEFINING AND INSTRUMENTING REUSABLE JAVA SERVER PAGE CODE SNIPPETS FOR WEBSITE TESTING AND PRODUCTION

(75) Inventors: James Leonard Timothy Fong, Milton (CA); Walfrey Ng, North York (CA); Ramiah Kwok-fai Tin, Pickering (CA); KimPing Yuen, Markh (CA)

(73) Assignee: International Business Machines Corporation, Armonk, NY (US)

( * ) Notice: Subject to any disclaimer, the term of this patent is extended or adjusted under 35 U.S.C. 154(b) by 1434 days.

This patent is subject to a terminal disclaimer.

(21) Appl. No.: 12/348,429

(22) Filed: Jan. 5, 2009

(65) Prior Publication Data

US 2009/0150871 A1 Jun. 11, 2009

Related U.S. Application Data

(62) Division of application No. 11/004,284, filed on Dec. 3, 2004, now Pat. No. 7,475,388.

(51) Int. Cl.
*G06F 9/45* (2006.01)

(52) U.S. Cl.
USPC .......................................................... 717/130

(58) Field of Classification Search
USPC ........................................................ 717/130
See application file for complete search history.

(56) References Cited

U.S. PATENT DOCUMENTS

| 6,633,889 | B2* | 10/2003 | Dessloch et al. ...................... 1/1 |
| 6,721,713 | B1* | 4/2004 | Guheen et al. ................. 705/1.1 |
| 7,412,457 | B2* | 8/2008 | Saracco et al. ........................ 1/1 |
| 2002/0004824 | A1* | 1/2002 | Cuan et al. ..................... 709/208 |
| 2003/0221184 | A1* | 11/2003 | Gunjal et al. ................. 717/118 |
| 2004/0030764 | A1* | 2/2004 | Birk et al. ...................... 709/223 |
| 2004/0107125 | A1* | 6/2004 | Guheen et al. .................... 705/7 |
| 2004/0148565 | A1* | 7/2004 | Davis et al. ................. 715/501.1 |
| 2006/0015839 | A1* | 1/2006 | Owens et al. ................. 717/100 |

* cited by examiner

*Primary Examiner* — John Chavis

(74) *Attorney, Agent, or Firm* — Steven Greenberg, Esq.; Carey, Rodriguez, Greenberg & O'Keefe

(57) ABSTRACT

Reusable JSP code snippets are defined and instrumented for Website testing and production. A user may define tile definitions in a markup language file for a number of JSP code snippets to be included in a store page. Upon receiving store inputs comprising tile definitions and jar files for the features, tables may be generated that map features to stores and features dependencies to features. Based on the tables, the store inputs may be validated. If no error occurs, run time files may be generated and JSP code snippets may be instrumented to the appropriate location for Website testing and production.

35 Claims, 8 Drawing Sheets

```
<?xml version="1.0" encoding="ISO-8859-1"?>
<!DOCTYPE definition SYSTEM "store-defs.dtd">

<?xml version="1.0" encoding="ISO-8859-1"?>
<store-definition identifier="TestStore1" storeDirectory="TestStore1">
    <feature name="CatalogBrowsing" />
    <feature name="Bundle" />
    <feature name="Checkout" />
    <feature name="UserAccount" />
</store-definition>
```

*FIG. 6*

```
<definition name="TestStoreDefinition" page="/TestStoreLayout.jsp">
        <put name="titleKey" value="$ {titleKey}" />
        <put name="header" value="/HeaderDisplay.jsp" />
        <put name="body" value="$ {body}" />
        <put name="footer" value="/FooterDisplay.jsp" />
</definition>
<!-- Use this parent definition when 1 snippet needs to be included
in the page -->
<definition name="TestStoreSnippet1Definition page="/
TestStoreSnippet1Layout.jsp">
        <put name="titleKey" value="$ {titleKey}" />
        <put name="header" value="/HeaderDisplay.jsp" />
        <put name="body" value="$ {body}" />
        <put name="snippet1" value="$ {snippet1}" />
        <put name="footer" value="/FooterDisplay.jsp"/>
</definition>
<!-- Use this parent definition when 2 snippets need to be included
in the page -->
<definition name="TestStoreSnippet2Definition" page="/
TestStoreSnippet2Layout.jsp">
        <put name="titleKey" value="$ {titleKey}" />
        <put name="header" value="/HeaderDisplay.jsp" />
        <put name="body" value="$ {body}" />
        <put name="snippet1" value="$ {snippet1}" />
        <put name="snippet2" value="$ {snippet2}" />
        <put name="footer" value="/FooterDisplay.jsp" />
</definition>
<!-- Standard Usage of Skeleton page layout -->
<definition name="TestStore.SkeletonPage"
extends="TestStoreDefinition">
        <put name="titleKey" value="TITLE1" />
        <put name="body" value="/SkeletonPage.jsp"/>
</definition>
<!-- Example of adding 1 Snippet to the Skeleton page -->
<definition name="TestStore.SkeletonPage1"
extends="TestStoreSnippet1Definition">
        <put name="titleKey" value="TITLE2" />
        <put name="body" value="/SkeletonPage.jsp" />
        <put name="snippet1" value="/Snippets/Component1/Feature1/
JSPCodeSnippet1.jsp" />
</definition>
<!-- Example of adding 2 Snippets on the Skeleton page -->
<definition name="TestStore.SkeletonPage2"
extends="TestStoreSnippet2Definition">
        <put name="titleKey" value="PAGE2_TITLE" />
        <put name="body"  value="/SkeletonPage2.jsp" />
        <put name="snippet1"  value="/Snippets/Component1/Feature1/
JSPCodeSnippet1.jsp" />
                <put name="snippet2"  value="/Snippets/Component1/Feature2/
JSPCodeSnippet2. jsp" />
</definition>
```

FIG. 8

```xml
<?xml version="1.0" encoding="ISO-8859-1"?>
<!DOCTYPE definition SYSTEM "feature-defs.dtd">
<!--
      Start: feature - CatalogBrowsing
-->
<feature-definition name="CatalogBrowsing" />  /* 802       /* 800
      <!--
            Section 1
      --> Specify the features that CatalogBrowsing has dependency on <dependency featureName="Checkout" />
      <!--
            Section 2
            List all the main forwards (struts-config) and the tiles-definition
for this feature.
            For example, the main forwards for CatalogBrowsing are:
            - TopCategoriesDisplayView
            - CategoriesDisplayView
            - ProductDisplayView
            The tiles definition for each of the above forwards are also defined
      -->
      <feature-forwards>
            <forward className="com.ibm.commerce.struts.ECActionForward"
name="ProductDisplayView/${storeId}" path=" ProductDisplay" />
            <forward className="com.ibm.commerce.struts.ECActionForward"
name="TopCategoriesDisplayView/${storeId}" path="TopCategoriesDisplay" />
            <forward className="com.ibm.commerce.struts.ECActionForward"
name="CategoryDisplayView/${storedId}" path="CategoryDisplay" />
      </feature-forwards>
      <tiles-definitions>       808
            <definition name="ProductDisplay" path=" /regular_template.jsp">
                  <put name="main" value=" /ProductDisplay.jsp" />
                  <put name="header" value=" /HeaderDisplay.jsp" />      816
                  <put name="sidebar" value=" /SideBarDisplay.jsp" />
            </definition>
            <definition name="TopCategoriesDisplay"   812
path=" /regular_template.jsp">  810                              818
                  <put name="main" value=" /TopCategoriesDisplay.jsp" />
                  <put name="header" value=" /HeaderDisplay.jsp" />
                  <put name="sidebar" value=" /SideBarDisplay.jsp" />
            </definition>                814                       810
            <definition name="CategoryDisplay" path=" /regular_template.jsp">
                  <put name="main" value=" /CategoryDisplay.jsp" />   820
                  <put name="header" value=" /HeaderDisplay.jsp" />
                  <put name="sidebar" value=" /SideBarDisplay.jsp" />
            </definition>
      </tiles-definitions>
      <!--
            Section 3
            List all the snippets that will be included in the main forwards of
other features
            This feature has no snippet that needs to be included in other pages
      -->
</feature-definition>
```

FIG. 9

```xml
<?xml version="1. 0" encoding=" ISO-8859-1"?>
< !DOCTYPE definition SYSTEM "feature-defs. dtd">
<!--
    Start: feature - Checkout
-->
<feature-definition name="Checkout">       /* 902 */                              /* 900 */
    <!--
        Section 1
        Specify the features that Bundle has dependency on
    -->
    <dependency featureName= "UserAccount"/>   /* 904 */
    <!--
        Section 2
        List all the main forwards (struts-config) and the tiles-definition for this feature.
        The tiles definition for each of the forwards are also defined
    -->
    <feature-forwards>
            <forward className="com.ibm.commerce.struts.ECActionForward"      /* 908 */
name="OrderItemDisplayViewShiptoAssoc/${storeId}" path="OrderItemDisplay"/>
            <forward className="com.ibm.commerce.struts.ECActionForward"
name="BillingAddressView/${storeId}" path="BillingAddress"/>                 /* 910 */
            <forward className="com.ibm.commerce.struts.ECActionForward"
name="MultipleShippingAddressView/${storeId}" path="MultipleShippingAddress"/>   /* 912 */
            <forward className="com.ibm.commerce.struts.ECActionForward"
name="OrderDisplayPendingView/${storeId}" path="OrderDisplayPending"/>       /* 914 */
            <forward className=com.ibm.commerce.struts.ECActionForward"
name="OrderOKView/$ {storeId}" path="OrderOK"/>
    </feature-forwards>                                                          /* 916 */
    <tiles-definitions>
            <definition name="OrderItemDisplay" path="/regular_template.jsp">
                    <put name="main" value="/OrderItemDisplay.jsp"/>
                    <put name="header" value="/HeaderDisplay.jsp"/>
                    <put name="sidebar" value="/SideBarDisplay.jsp"/>
            </definition>
            <definition name="BillingAddress" path="/regular_template.jsp">
                    <put name="main" value=" /BillingAddressDisplay.jsp" />
                    <put name="header" value="/HeaderDisplay.jsp"/>
                    <put name=" sidebar" value="/SideBarDisplay.jsp" />
            </definition>
            <definition name="MultipleShippingAddress"
path="/regular_template.jsp">
                    <put name="main" value="/MultipleShippingAddressDisplay.jsp"/>
                    <put name="header" value="/HeaderDisplay.jsp"/>
                    <put name="sidebar" value="/SideBarDisplay.jsp"/>
            </definition>
            <definition name="OrderDisplayPending" path="/regular_template.jsp">
                    <put name="main' value="/OrderDisplayPendingDisplay.jsp"/>
                    <put name="header" value=" /HeaderDisplay.jsp" />
                    <put name="sidebar" value="/SideBarDisplay.jsp"/>
            </definition>
            <definition name="OrderOK" path=/regular_template. jsp" >
                    <put name="main" value="/OrderOKViewDisplay.jsp"/ >
                    <put name="header" value="/HeaderDisplay.jsp"/>
                    <put name="sidebar" value="/SideBarDisplay.jsp "/ >
            </definition>
    </tiles-definitions>
```

906 { (brace encompassing the tiles-definitions block)

FIG. 10

```
<?xml version="1.0" encoding="ISO-8859-1"?>                      1000
<!DOCTYPE definition SYSTEM "feature-defs.dtd">
<!--
      Start: feature - Bundle
-->
<feature-definition name = "Bundle" >          /1002
      <!--
            Section 1
            Specify the features that Bundle has dependency on
      -->
      <dependency featureName="Checkout"/>
      <dependency featureName="CatalogBrowsing"/>
      <!--
            Section 2
            List all the main forwards (struts-config) and the tiles-definition for this feature.
            This feature has no main forwards. All the JSPs are snippets that are included in other pages.
      -->
      <feature-forwards>
            <forward className="com.ibm.commerce.struts.ECActionForward"
name="BundleDisplayView/${storeId}" path="BundleDisplay"/>
      </feature-forwards>
                                             1010
      <tiles-definitions>
            <definition name="BundleDisplay" path="/regular_template.jsp">
                  <put name="main" value="/BundleDisplay.jsp"/>
                  <put name="header" value=/HeaderDisplay.jsp"/>
                  <put name="sidebar" value=/SideBarDisplay.jsp"/>
            </definition>
      </tiles-definitions>
      <!--
            Section 3
            List all the snippets that will be included in the main forwards of other features
            For example, the BundleListDisplay.jsp will be included in the CategoryDisplayView page.
      -->
      <inclusion-definition feature="CatalogBrowsing"
definitionName="CategoryDisplay">~1014
            <put name="snippet" ~1012
value="/Snippets/Catalog/BundleListDisplay.jsp"/>~1016
      </inclusion-definition>
</feature-definition>
```

1004 brackets Section 1
1006 brackets Section 2
1008 brackets Section 3

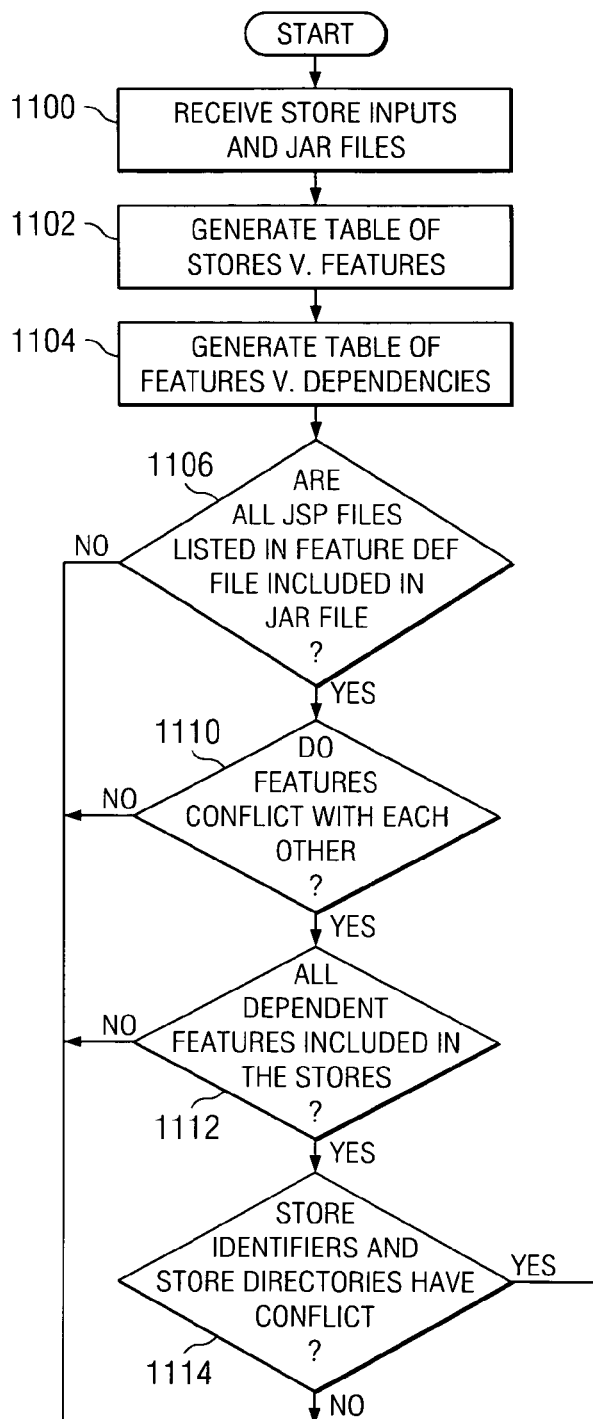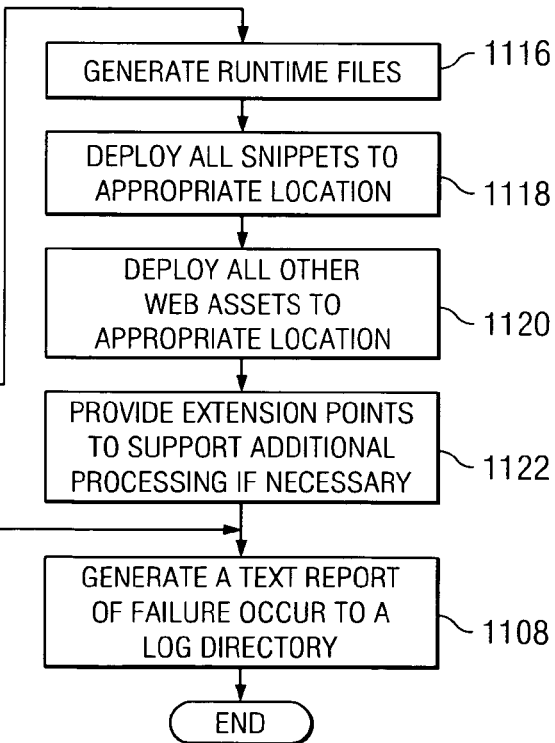
FIG. 11

METHOD AND APPARATUS FOR DEFINING AND INSTRUMENTING REUSABLE JAVA SERVER PAGE CODE SNIPPETS FOR WEBSITE TESTING AND PRODUCTION

CROSS-REFERENCE TO RELATED APPLICATIONS

This application is a Divisional of U.S. application Ser. No. 11/004,284, filed Dec. 3, 2004, entitled "METHOD AND APPARATUS FOR DEFINING AND INSTRUMENTING REUSABLE JAVA SERVER PAGE CODE SNIPPETS FOR WEBSITE TESTING AND PRODUCTION," which is incorporated herein by reference in its entirety.

BACKGROUND OF THE INVENTION

1. Field of the Invention

The present invention relates to an improved data processing system. In particular, the present invention relates to Java™ server pages in a data processing system. Still more particularly, the present invention relates to defining and instrumenting Java server pages code snippets for website testing and production in a data processing system.

2. Description of the Related Art

In a typical electronic business cycle, Website production involves multiple development groups, including page designers and Java developers. Page designers design individual Web pages for the Website, while Java developers develop application logic behind the Web pages. Both groups execute test cases or scenarios using Web pages from the page designers and application logic from the Java developers before deploying the Website into production.

When developing Web pages, page designers often require references to other types of resources. These resources include J2EE enterprise JavaBeans™ and Java application programming interface (API) developed by the Java developers (Java and all Java-related marks are trademarks of Sun Microsystems, Inc. in the United States, other countries, or both). J2EE enterprise JavaBeans are reusable components that perform specific business functions. Java APIs are interfaces that are developed using the Java programming language of Java 2 Standard Edition. J2EE enterprise JavaBeans and Java APIs provide application logic behind Web pages that are developed by the page designers.

On the other hand, Java developers also need certain Web pages created by the page designers in order to verify their application logic. However, not all of the application features provided by the Java developers are needed by the page designers to create Web pages. Some features may be needed by one store, while other features may be needed by another store. In addition, when Java developers test their application logic, they create many alternatives and exception conditions in the test environment that may not be necessary in the Website, depending on the requirements. Thus, the page designers and Java developers each have their own set of test requirements for the Website.

BRIEF SUMMARY OF THE INVENTION

The present invention provides a method, apparatus, and computer program product for defining and instrumenting Java Server Page code snippets for Website testing and production. A user may define tile definitions of desirable JSP code snippets to be included in a skeleton of store pages in a markup language file. Upon receiving store inputs comprising tile definitions and jar files, tables are generated that map features for each store and feature dependencies for each feature. The jar file includes a set of definitions and required snippets for each feature that is defined.

A number of validations may be performed to determine if all the required JSP files are included in the jar file, if selected features conflict with each other, if all dependent features are included in the stores, and if the store identifiers and store directories have conflicts. If any of the validations fails, the present invention logs the error. Otherwise, runtime files may be generated and the JSP code snippets may be deployed to the appropriate location.

BRIEF DESCRIPTION OF THE SEVERAL VIEWS OF THE DRAWINGS

FIG. 6 is a diagram illustrating an exemplary XML tile definition configuration file for JSP code snippets inclusion in accordance with an aspect of the present invention.

FIG. 8 is a diagram illustrating an exemplary XML feature definition for a catalog browsing feature in accordance with an aspect of the present invention.

FIG. 9 is a diagram illustrating an exemplary XML feature definition for a checkout feature in accordance with an aspect of the present invention.

FIG. 10 is a diagram illustrating an exemplary XML feature definition for a bundle feature in accordance with an aspect of the present invention.

FIG. 11 is a flowchart of an exemplary process for defining and instrumenting reusable JSP code snippet for Website testing and production in accordance with an aspect of the present invention.

DETAILED DESCRIPTION OF THE INVENTION

Figure 1:
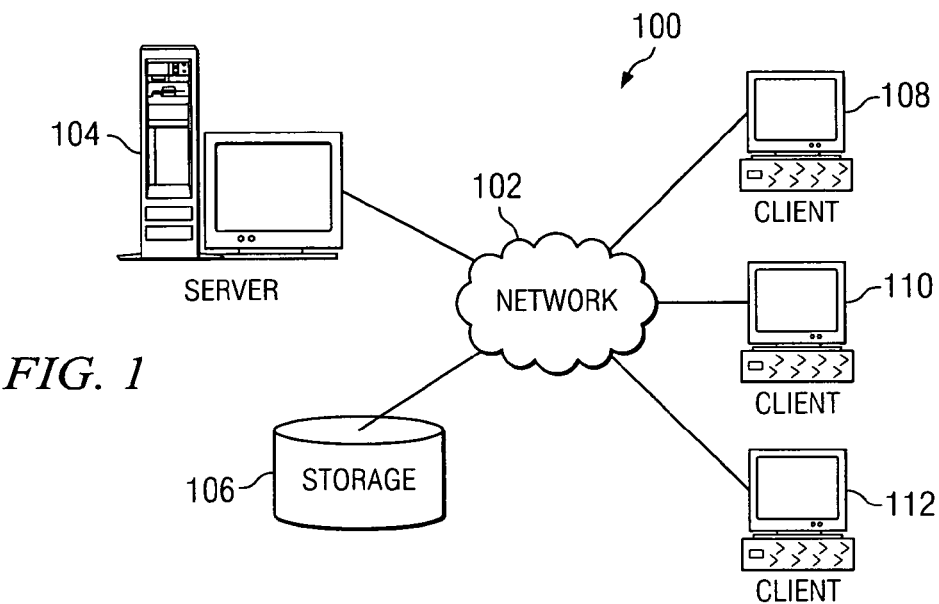
FIG. 1 is a pictorial representation of a network of data processing systems in which the present invention may be implemented.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
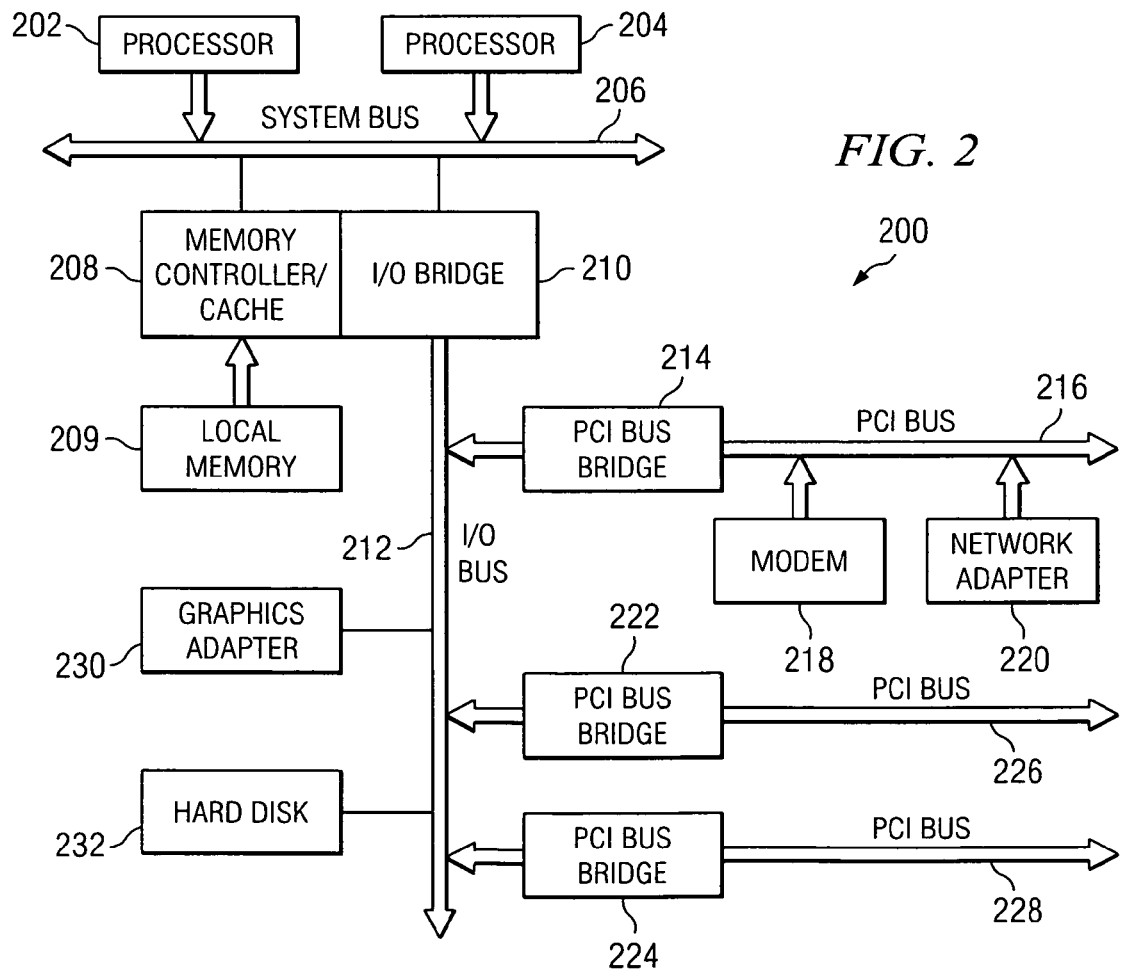
FIG. 2 is a block diagram of a data processing system that may be implemented as a server, in accordance with an aspect of the present invention.

Referring to FIG. 2, a block diagram of a data processing system that may be implemented as a server, such as server 104 in FIG. 1, is depicted in accordance with an aspect of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ pseries® computer system, running the Advanced Interactive Executive (AIX®) operating system or LINUX operating system (IBM, eServer, pSeries and AIX are trademarks of International Business Machines Corporation in the United States, other countries, or both while Linux is a trademark of Linus Torvalds in the United States, other countries, or both).

Figure 3:
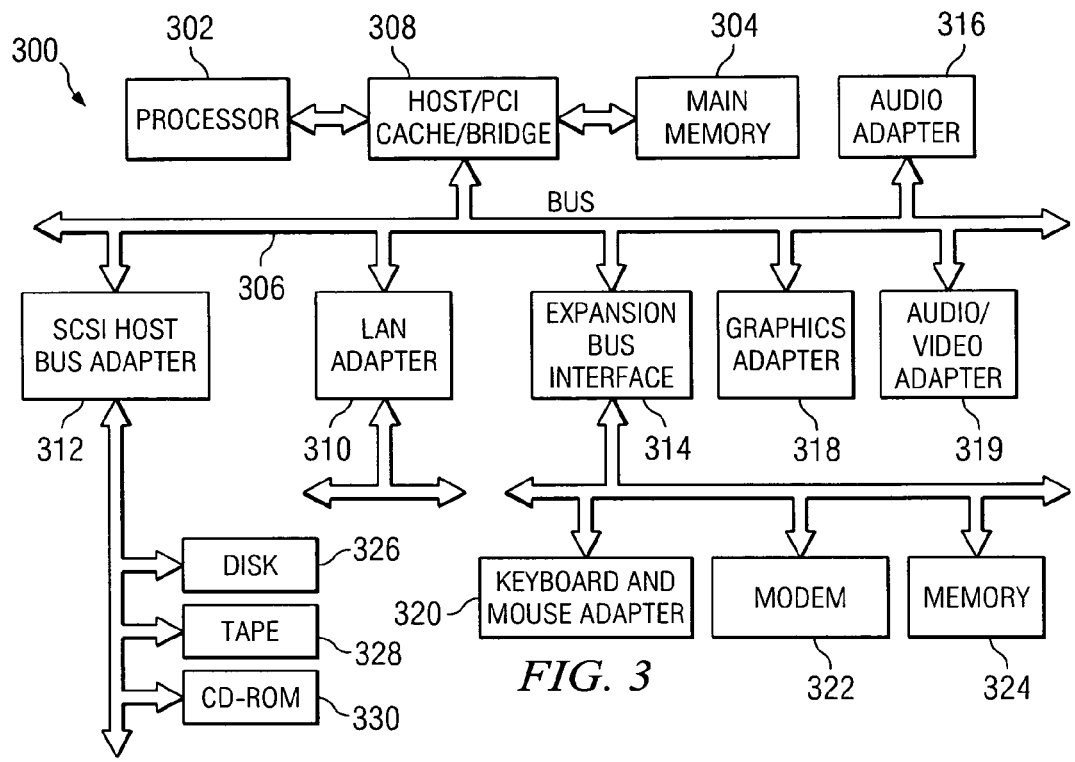
FIG. 3 is a block diagram illustrating a data processing system in which an aspect of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

A method, apparatus, and computer program product for defining and instrumenting reusable Java Server pages code snippets for Website testing and production is provided. Reusable Java server pages code snippets in a markup language file are defined and the defined code snippets are instrumented into a skeleton of store pages, such that functionalities of a Website may be implemented in a pluggable manner for testing and production.

A Java server page (JSP) is a dynamic Web page that includes a set of functionalities. A Java server page code snippet is a fragment of the JSP that provides a subset of the functionalities or a feature, such as, a promotion feature of an online retail store. In an aspect of the present invention, a searchable library of functions as a set of JSP code snippets is provided. Page designers and Java developers may assemble a set of JSP codes snippets in the searchable library as building blocks for constructing a Web site. Thus, page designers and Java developers may add different functionalities to the Web site using different JSP code snippet.

A way to plug in desirable JSP code snippets into a skeleton of a basic business flow is provided. A skeleton includes a number of store pages that form a business flow for the Website. For example, a retail store skeleton may include a category display page, which allows customers to choose a list of products; a product display page, which lists each of the products; and a shopping cart page, which allows a customer to check out the chosen products.

In order to accommodate a variety of functional testing requirements and a need of different features for different business models, a set of JSP code snippets are instrumented into the skeleton. Each JSP code snippet is self sufficient, and does not rely on other setup or variables defined in the skeleton store pages. Instrumentation of JSP code snippets to the store pages with standard JSP syntax may be allowed. Since the JSP code snippets are fragments of a JSP page, the JSP code snippets do not include certain HTML tags, for example, the head tag and the body tag.

In an aspect of the present invention, a store definition file is taken as an input for a Website or a store, which defines a set of feature definitions desired by the user. For each feature, a jar file is included. The jar file includes a set of definitions and required snippets for the feature that is defined.

Once the inputs are received, a table is generated that maps features that are defined in the input file to the corresponding store. In addition to a mapping of features and stores, a tables of features and feature dependencies is also generated. Feature dependencies are other features that a feature depends, for example, a bundle feature may depend on a category browsing feature in order to display a list of products to the on-line shopper.

After the mapping tables are generated, all the inputs are validated. The validations include checking the jar file to see if it contains all the JSP files as defined in feature definitions, checking if the features conflict with one another, checking if a store includes all the dependent features, and checking if the store directories have conflicts. If an error is found in any one of the validations, a text report is generated for any failure that occurs to a log directory.

Once the validations are performed, run time files that are necessary for the store are generated, for example, struts-config.xml file, and the run time files including the JSP code snippets to the appropriate location are deployed. At the same time, other required Web assets, such as layout files, are also deployed. Thus, after the run time files are deployed, the JSP code snippets are now instrumented.

At run time, an on-line shopper may click on a link or a button of a JSP code snippet displayed in a store page. The system either displays another skeleton store page, which in turn may include another JSP code snippet, or displays another store page in which the main content is obtained from a JSP code snippet.

Since users may pick and choose reusable JSP code snippets to be included in store pages, efforts required to develop store pages are minimized and overall development costs are reduced. Also, a user may pick and choose desirable features based on the business model by instrumenting desired JSP code snippets.

Figure 4:
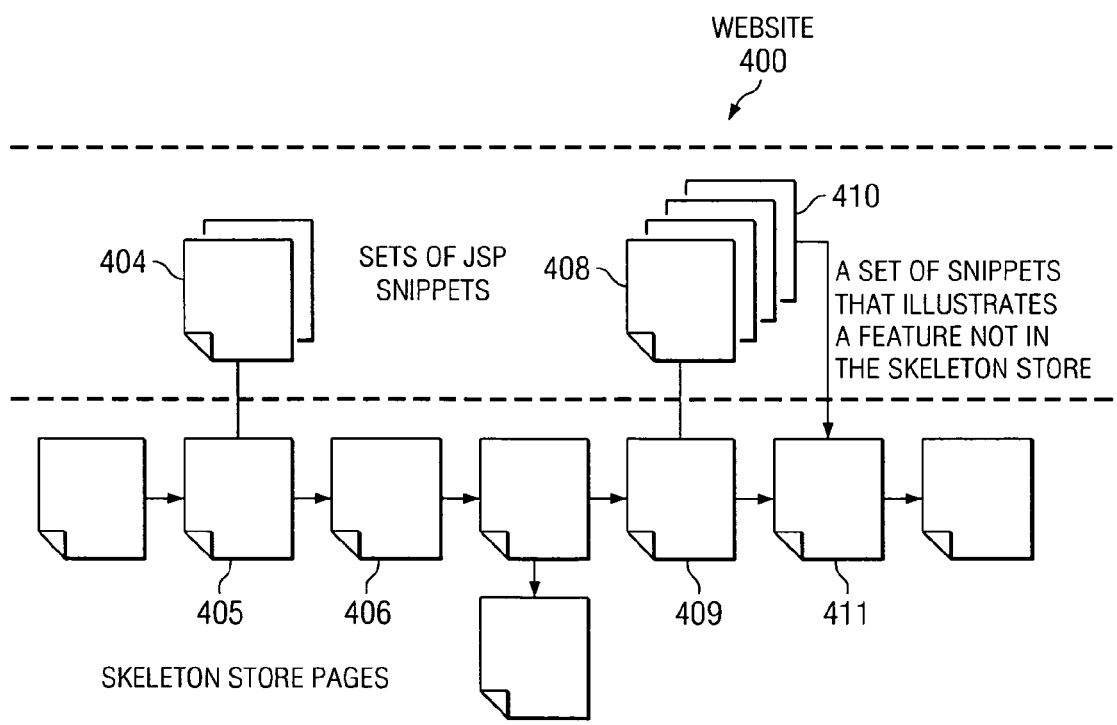
FIG. 4 is a diagram illustrating interaction between components for defining and instrumenting JSP codes snippets in accordance with an aspect of the present invention.

Turning now to FIG. 4, a diagram illustrating interaction between components for defining and instrumenting JSP codes snippets is depicted in accordance with an aspect of the present invention. As shown in FIG. 4, Website 400 may be implemented on a Web server using a server, such as data processing system 200 in FIG. 2. In this example, Website 400 includes skeleton store pages 405, 406, and 409 and JSP code snippets 404, 408 and 410. Skeleton store pages 405, 406, and 409 describe a business flow for the Website.

In a first scenario, Java developers instrumented JSP code snippets 404 in store page 405. Store page 405 may be one of the Web pages designed by the page designer. At run time, since JSP code snippet 404 is included in skeleton store page 405, the displayed store page is composed of both the skeleton and the snippet. In this case, JSP code snippets 404 include application logic developed by Java developers that are used for testing purposes or provide a specific feature. After a shopper clicks a button or a link in store page 405, the system displays another skeleton store page 406, which in turn may include another set of JSP code snippets.

In a second scenario, Java developers instrumented JSP code snippets 408 in store page 409. The store page displays the content of both skeleton store page 409 and JSP code snippet 408. At run time, when a shopper clicks on a button or link in the snippet 408, the shopper is directed to another JSP code snippet 410, which are not included in any skeleton store page 409. In this case, the snippet itself becomes the store page and the main content of the page is obtained from a JSP code snippet. This scenario occurs usually when skeleton pages do not provide the features in JSP codes snippets 408 and 410. When JSP code snippets 408 and 410 are displayed, some of the links or buttons in JSP code snippets 408 and 410 direct the shopper to the next store page 411.

Figures 5, 7:
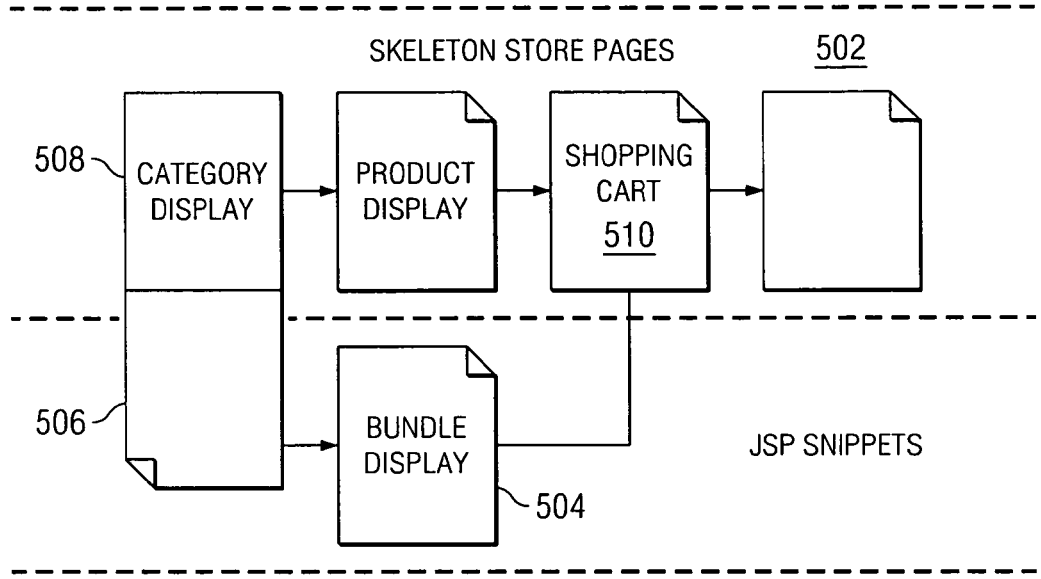
FIG. 5 is a diagram illustrating an exemplary instrumentation of JSP code snippets in an online retail store in accordance with an aspect of the present invention.
FIG. 7 is a diagram illustrating an exemplary XML store definition for a test store in accordance with an aspect of the present invention.

Turning now to FIG. 5, a diagram illustrating an exemplary instrumentation of JSP code snippets in an online retail store is depicted in accordance with an aspect of the present invention. As depicted in FIG. 5, online retail store 500 is a Website with a skeleton of store pages, such as Website 400 in FIG. 4. Online retail store 500 currently does not support a bundle feature, which is a set of products. Therefore, Java developers attempt to instrument the bundle feature to skeleton store pages 502 in online retail store 500 using JSP code snippets bundle display 504.

In this example implementation, new category JSP code snippet 506 with bundle support is appended to the bottom of skeleton store page category display 508 in order to add functionality to the store. When a shopper clicks on a bundle link in category JSP code snippet 506, the bundle display JSP code snippet 504 is displayed. If a shopper selects an 'Add to Order' button in bundle display JSP code snippet 504, the shopper is directed to shopping cart skeleton store page 510.

In addition to selecting JSP code snippets from a searchable library, page designers and Java developers may be allowed to instrument JSP code snippets using eXtensible Markup Language (XML) tile definitions. As a person of ordinary skill in the art would appreciate, content of a JSP page may be divided into a number of tiles. Each tile represents a specific functionality and presentation for the JSP page. XML tile definition is a way of defining each tile of a JSP page in XML configuration file. By using XML tile definitions, developers may insert different content to a JSP file.

In order to compose a store using a set of JSP code snippets, a XML tile definition configuration file may be used to include the new snippets. In addition, a flexible snippet inclusion may be provided by preparing a number of templates to adapt different JSP code snippets.

Turning now to FIG. 6, a diagram illustrating an exemplary XML tile definition configuration file for JSP code snippets inclusion is depicted in accordance with an aspect of the present invention. As depicted in FIG. 6, in this example implementation, in XML tile definition configuration file 600, a definition name of TestStoreDefinition 602 is defined for pages that only include one skeleton page or one snippet. The tile layout JSP used for this definition is TestStoreLayout.jsp 604.

In order to include JSP code snippet in skeleton page of the test store, such as SkeletonPage.jsp 606, the definition of TestStoreSnippet1Definition 608 and TestStore.SkeletonPage1 610 extends the TestStoreSnippet1Definition 608 using the "extends" attribute 612 and specifies the location of the JSP file for the JSP code snippet using "snippet1" attribute 614. In this example, the location of JSP code snippet is "/Snippets/Components1/Feature1/JSPCodeSnippet1.jsp" 616.

TestStoreSnippet1Definition 608 is a parent definition that uses TestStoreSnippet1Layout.jsp 618 to insert a body page and JSPCodeSnippet1 616, which was previously defined in "snippet1" attribute 620. Any store page that needs to include one snippet may extend from TestStoreSnippet1Definition 608.

Similarly, TestStoreSnippet2Definition 622 uses TestStoreSnippet2Layout.jsp 624 to include two JSP code snippets to the TestStore.SkeletonPage2 626. An extension of the tile definition is defined from TestStoreSnippet2Definition 622 and specifies the location of the two JSP files for the JSP code snippets by using "snippet1" 628 and "snippet2" 630 attributes. The location of JSP code snippet for "snippet1" is "/Snippets/Component1/Feature1/JSPCodeSnippet1.jsp" 632 and the location of snippet2 is "/Snippets/Component1/Feature1/JSPCodeSnippet2.jsp" 634. Thus, developers may explicitly define one or more JSP code snippets to be included in a store page in the XML tile definition configuration file. In addition, the same layout page may be used for more than one definition.

Turning now to FIG. 7, a diagram illustrating an exemplary XML store definition for a test store is depicted in accordance with an aspect of the present invention. As depicted in FIG. 7, in XML store definition 700, a test store name, TestStore1 702 is defined, which includes four features: CatalogBrowsing feature 704, Bundle feature 706, Checkout feature 708, and UserAccount feature 710.

Turning now to FIG. 8, a diagram illustrating an exemplary XML feature definition for a catalog browsing feature is depicted in accordance with an aspect of the present invention. As depicted in FIG. 8, in XML feature definition configuration file 800, feature name catalogBrowsing feature 802 is defined. XML feature definition of CatalogBrowsing feature 802 includes 2 sections: a list of dependences on other features 804 and all the forward features with their corresponding tiles definitions 806.

In this example, CatalogBrowsing feature 802 depends on one Checkout feature 804. CatalogBrowsing feature 802 has three main forwards: TopCategoriesDisplay 812, CategoriesDisplay 814, and ProductDisplay 808. A main forward is used to define a JSP page to be displayed responsive to an action received in a user request. Typically, main forwards are used to help generate a Struts configuration file, which determines the routing of a business flow. More information regarding the manner by which main forwards are used in the context of a Struts framework may be obtained from the Struts project, version 1.2.6, available from the Apache Software Foundation, which is hereby incorporated by reference.

While tiles definitions ProductDisplay 808, TopCategoriesDisplay 812 and CategoryDisplay 814 are all included in the same template, regular_template.jsp 810, the content of ProductDisplay 808 feature, TopCategoriesDisplay 812, and CategoryDisplay 814 are located in ProductDisplay.jsp 816, TopCategoriesDisplay.jsp 818, and CategoryDisplay.jsp 820, respectively.

Turning now to FIG. 9, a diagram illustrating an exemplary XML feature definition for a checkout feature is depicted in accordance with an aspect of the present invention. As shown in FIG. 9, similar to CatalogBrowsing feature 802 in FIG. 8, XML feature definition configuration file 900 includes name definition of checkout feature 902. Checkout feature 902 depends on a UserAccount feature 904.

Also similar to CatalogBrowsing feature 802 in FIG. 8, Checkout feature 902 includes five forward features with their tiles definitions 906. These forward features are OrderItemDisplay 908, BillingAddress 910, MultipleShippingAddress 912, OrderDisplayPending 914, and OrderOK 916. Just like the tiles definitions in FIG. 8, forward features 908-916 are included in the same template, the content of each forward feature is located in different JSP files.

Turning now to FIG. 10, a diagram illustrating an exemplary XML feature definition for a bundle feature is depicted in accordance with an aspect of the present invention. As shown in FIG. 10, XML feature definition configuration file 1000 includes name definition for bundle feature 1002. Feature definition of Bundle feature 1002 includes 3 sections: a list of dependencies on other features 1004 and feature forwards with their corresponding tiles definitions 1006, and a list of JSP code snippets that are included in feature 1008.

Bundle feature 1002 includes a forward feature of BundleDisplay 1010, which provides a display of details for each product in the bundle. JSP code snippet section 1008 defines where to include the JSP code snippet to a page. The inclusion definition entry 1014 defines that the JSP code snippet should be included in CategoryDisplay page of the Catalog Browsing feature 802 in FIG. 8. The inclusion definition section defines the location of the JSP code snippet 1016 with name "snippet" 1012. The location of the JSP code snippet is located in "/Snippets/Catalog/BundleListDisplay.jsp" 1016. BundleListDisplay.jsp 1016 provides a display of a list of bundles.

Turning now to FIG. 11, a flowchart of an exemplary process for defining and instrumenting reusable JSP code snippet for Website testing and production is depicted in accordance with an aspect of the present invention. As shown in FIG. 11, the process begins with the reception of store inputs and jar files from a user request (step 1100).

Store inputs are store definition files, such as TestStore1 702 in FIG. 7. Store definition files include information such as the store directory and the store identifier. A jar file is defined for each feature. The jar file includes a set of JSP files that defines the logic of the JSP code snippets that are defined for the feature, as well as a set of properties files for the respective JSP code snippets. The jar file also includes a feature definition file, such as XML feature definition configuration file 800, which defines catalogBrowsing feature 802 in FIG. 8.

Next, a table is generated that maps a number of stores to a number of features (step 1102). The table provides an interpretation of what features are available for which store. In addition, a table is generated that maps a number of features to a number of feature dependencies (step 1104). For example, in FIG. 10, a bundle feature may require a catalog browsing feature so that a listing of bundles can be displayed. Thus, feature dependencies are determined and all dependent features are included in the stores prior to deploying the Website.

Once the tables are generated, the inputs are validated to determine errors. The first validation is to determine if the jar file received includes all the JSP files that are listed in the feature definition file (step 1106). If the jar file does not include all the JSP files listed in the feature tile definition file, the process continues to step 1108.

Otherwise, the second validation is performed to determine if features that are listed in the feature definition file conflict with each other (step 1110). This step includes determining if two jar files may have the same feature names, which means the features conflict with each other. If the features conflict with each other, the process continues to step 1108.

If the features do not conflict with each other, the third validation is performed to determine if dependent features are included in requested stores (step 1112). This step is performed based on the table of features and features dependencies generated in step 1106. This step includes determining if the stores include all of their dependencies, since the stores should not have any broken link. If the dependent features are not included in the stores, the process continues to step 1108.

If the dependent features are included in the stores, a fourth validation is performed to determine if the store identifiers and the store directories from the mapping tables or environment have conflicts (step 1114). This step is performed to ensure that two stores may not have the same store directory or store identifier. If the store identifiers and the store directories have conflicts, the process continues to step 1108. At step 1108, a text report of the failure that occurred to a log directory is generated, and the process terminates thereafter.

If the store identifiers and the store directories do not have conflicts, necessary run time files (step 1116) for the Website are generated, including struts-config.xml file, which describes routing of the business flow for the Website. All JSP code snippets to the appropriate location (step 1118) are then deployed by copying the JSP code snippets and their corresponding properties files from the jar files.

In addition, other required Web assets are also deployed to the appropriate location (step 1120). These Web assets include the layout JSP files and cascade style sheet files that describe the page layout. If necessary, extension points are also provided to support additional processing for customization (step 1122). Once the stores are generated, the process terminates thereafter.

In summary, a method and apparatus is provided to instrument reusable JSP code snippets into a skeleton of store pages, such that functionalities of a Website may be implemented in a pluggable manner for testing and production. In addition, existing Struts and Tiles technologies is leveraged and a method for defining tiles definitions for different features of a store is provided.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method in a data processing system for defining and instrumenting reusable code snippets for Website testing and production, the method comprising:
    defining a set of features for a Website in a first markup language file;
    defining at least one code snippet to be included in each feature within the set of features in the first markup file;
    generating a table that maps a number of features to a number of dependent features;
    validating the first markup language file by determining if all features and dependent features are included and if there is any conflict among the features; and
    generating at least one runtime file for the Website in response to the validation of the first markup language file.

2. The method of claim 1, further comprising:
    generating at least one mapping table in response to receiving a user request comprising store inputs;
    validating the store inputs using the at least one mapping table; and
    deploying at least one run time file for the Website.

3. The method of claim 1, wherein each feature within the set of features is defined by specifying at least one location of a Java server page for the feature.

4. The method of claim 1, wherein the markup language is extensible markup language.

5. The method of claim 1, wherein the Website comprises a skeleton of store pages.

6. The method of claim 1, wherein the at least one code snippet is a Java server page code snippet, and wherein the Java server page code snippet is a fragment of a Java server page.

7. The method of claim 1, wherein the at least one code snippet is defined by specifying a location of a Java server page for the at least one code snippet, and a feature name in which the at least one code snippet is to be included.

8. The method of claim 2, wherein the store inputs comprise the first markup language file in which the set of features for the Website is defined and a jar file for each feature within the set of features defined in the first markup language file.

9. The method of claim 8, wherein the first markup language file comprises a file directory on the data processing system representing a store directory, and a store identifier for the Website.

10. The method of claim 9, wherein the jar file comprises a second markup language file, at least one Java server page file, and at least one properties file, for each feature within the set of features defined.

11. The method of claim 10, wherein generating at least one mapping table in response to receiving a user request comprising store inputs comprises:
    generating a first table that maps the set of features to at least one Website; and
    generating a second table that maps at least one feature dependency to at least one feature of the set of features, wherein the at least one feature dependency is a feature which the at least one feature depends on.

12. The method of claim 11, wherein validating the store inputs using the at least one mapping table comprises:
    determining if the jar file includes all Java server pages files listed in the second markup language file for each of the set of features defined;
    determining if a feature in the set of features defined conflicts with another feature in the set;
    determining if the Website includes all feature dependencies based on the second table; and
    determining if the Website includes a broken link.

13. The method of claim 12, wherein determining if a feature in the set of features defined conflicts with another feature in the set comprises:
    determining if a feature of the set of feature has same feature name as another feature in the set.

14. The method of claim 12, wherein determining if the Website includes a broken link comprises:
    examining the second markup language file; and
    determining if the store identifier and the store directory have conflict with another Website.

15. The method of claim 2, wherein deploying at least one run time file for the Website comprises:
    generating at least one run time file for the Website based on the validations;
    deploying the at least one run time file to at least one location;
    deploying required Web assets to the at least one location; and
    providing extension points to support additional processing.

16. A data processing system comprising:
a processor unit;
a computer readable storage memory for defining and instrumenting reusable code snippets for Website testing and production, the computer readable storage memory having stored therein computer readable program instructions, which when executed, cause the data processing system to perform the operations comprising:
defining a set of features for a Website in a first markup language file;
defining at least one code snippet to be included in each feature within the set of features in the first markup file;
generating a table that maps a number of features to a number of dependent features;
validating the first markup language file by determining if all features and dependent features are included and if there is any conflict among the features; and
generating at least one runtime file for the Website in response to the validation of the first markup language file.

17. The data processing system of claim 16, further comprising:
generating at least one mapping table responsive to receiving a user request comprising store inputs;
validating the store inputs using the at least one mapping table; and
deploying at least one run time file for the Website.

18. The data processing system of claim 17, wherein the store inputs comprises the first markup language file in which the set of features for the Website is defined and a jar file for each feature within the set of features defined in the first markup language file.

19. The data processing system of claim 18, wherein the first markup language file comprises a file directory on the data processing system representing a store directory, and a store identifier for the Website.

20. The data processing system of claim 19, wherein the jar file comprises a second markup language file, at least one Java server page file, and at least one properties file, for each feature within the set of features defined.

21. The data processing system of claim 20, wherein the generating at least one mapping table comprises:
generating a first table that maps the set of features to at least one Website;
generating a second table that maps at least one feature dependency to at least one feature of the set of features, wherein the at least one feature dependency is a feature which the at least one feature depends on.

22. The data processing system of claim 21, wherein the validating comprises:
determining if the jar file includes all Java server pages files listed in the second markup language file for each of the set of features defined;
determining if a feature in the set of features defined conflicts with another feature in the set;
determining if the Website includes all feature dependencies based on the second table; and
determining if the Website includes a broken link.

23. The data processing system of claim 22, wherein determining if a feature in the set of features defined conflicts with another feature in the set comprises:
determining if a feature of the set of feature has same feature name as another feature in the set.

24. The data processing system of claim 22, wherein the determining if the Website includes a broken link comprises:
examining the second markup language file; and
determining if the store identifier and the store directory have conflict with another Website.

25. The data processing system of claim 17, wherein the deploying comprises:
generating at least one run time file for the Website based on the validations;
deploying the at least one run time file to at least one location;
deploying required Web assets to the at least one location; and
providing extension points to support additional processing.

26. A computer program product comprising a computer readable storage memory for defining and instrumenting reusable code snippets for Website testing and production, the computer readable storage memory having stored therein computer readable program instructions, which when executed, cause a data processing system to perform the operations comprising:
defining a set of features for a Website in a first markup language file;
defining at least one code snippet to be included in each feature within the set of features in the first markup file;
generating a table that maps a number of features to a number of dependent features;
validating the first markup language file by determining if all features and dependent features are included and if there is any conflict among the features; and
generating at least one runtime file for the Website in response to the validation of the first markup language file.

27. The computer program product of claim 26, further comprising:
generating at least one mapping table responsive to receiving a user request comprising store inputs;
validating the store inputs using the at least one mapping table; and
deploying at least one run time file for the Website.

28. The computer program product of claim 27, wherein the store inputs comprises the first markup language file in which the set of features for the Website is defined and a jar file for each feature within the set of features defined in the first markup language file.

29. The computer program product of claim 28, wherein the first markup language file comprises a file directory on the data processing system representing a store directory, and a store identifier for the Website.

30. The computer program product of claim 29, wherein the jar file comprises a second markup language file, at least one Java server page file, and at least one properties file, for each feature within the set of features defined.

31. The computer program product of claim 30, wherein the generating at least one mapping table comprises:
generating a first table that maps the set of features to at least one Website;
generating a second table that maps at least one feature dependency to at least one feature of the set of features, wherein the at least one feature dependency is a feature which the at least one feature depends on.

32. The computer program product of claim 31, wherein the validating comprises:
determining if the jar file includes all Java server pages files listed in the second markup language file for each of the set of features defined;
determining if a feature in the set of features defined conflicts with another feature in the set;

determining if the Website includes all feature dependencies based on the second table; and determining if the Website includes a broken link.

33. The computer program product of claim 32, wherein determining if a feature in the set of features defined conflicts with another feature in the set comprises:

determining if a feature of the set of feature has same feature name as another feature in the set.

34. The computer program product of claim 32, wherein the determining if the Website includes a broken link comprises:

examining the second markup language file; and determining if the store identifier and the store directory have conflict with another Website.

35. The computer program product of claim 27, wherein the deploying comprises:

generating at least one run time file for the Website based on the validations;

deploying the at least one run time file to at least one location;

deploying required Web assets to the at least one location; and providing extension points to support additional processing.

* * * * *